United States Patent [19]

Chen et al.

[11] Patent Number: 5,000,856
[45] Date of Patent: Mar. 19, 1991

[54] METHOD FOR CONTROLLING SCALE DEPOSITION IN AQUEOUS SYSTEMS USING ALLYL SULFONATE/MALEIC ANHYDRIDE POLYMERS

[75] Inventors: Shih-Ruey T. Chen, Coraopolis; Craig W. Vaughan, Freedom, both of Pa.

[73] Assignee: Calgon Corporation, Pittsburgh, Pa.

[21] Appl. No.: 482,426

[22] Filed: Feb. 20, 1990

Related U.S. Application Data

[63] Continuation of Ser. No. 226,698, Aug. 1, 1988, abandoned.

[51] Int. Cl.$^5$ ................................................ C02F 5/14
[52] U.S. Cl. .................................... 210/694; 210/701; 252/180
[58] Field of Search ............................ 210/696–701; 252/180, 181

[56] References Cited

U.S. PATENT DOCUMENTS

| | | | |
|---|---|---|---|
| 3,879,288 | 4/1975 | Siegele | 210/701 |
| 4,001,134 | 1/1977 | Markofsky et al. | 210/698 X |
| 4,166,040 | 8/1979 | Goodman | 210/701 X |
| 4,342,652 | 8/1982 | Schiller et al. | 210/698 |
| 4,444,675 | 4/1984 | Goeldner | 210/698 X |
| 4,536,292 | 8/1985 | Matz | 210/701 |
| 4,618,448 | 10/1986 | Cha et al. | 210/698 X |
| 4,640,793 | 2/1987 | Persinski et al. | 210/698 X |

*Primary Examiner*—Tom Wyse
*Attorney, Agent, or Firm*—W. C. Mitchell; J. F. DiPrima

[57] ABSTRACT

This invention is directed to a method for controlling the formation of scale deposits in aqueous systems operated at high pH and/or calcite saturation levels by adding an effective amount, preferably at least 0.1 ppm, of an allyl sulfonate/maleic anhydride polymer to the aqueous system being treated.

4 Claims, No Drawings

METHOD FOR CONTROLLING SCALE DEPOSITION IN AQUEOUS SYSTEMS USING ALLYL SULFONATE/MALEIC ANHYDRIDE POLYMERS

This is a continuation of application Ser. No. 226,698, filed 8/1/88, now abandoned.

BACKGROUND OF THE INVENTION

U.S. Pat. Nos. 3,706,717 and 3,879,288 disclose the use of vinyl sulfonate/monovinyl compound copolymers as scale inhibitors.

U.S. Pat. No. 4,001,134 discloses the use of maleic anhydride/allyl acetate copolymers as scale inhibitors in sea-water distillation plants.

U.S. Pat. No. 4,253,968 discloses the use of maleic acid/allyl monomer copolymers as cooling water scale inhibitors.

U.S. Pat. No. 4,342,652 discloses the use of maleic acid/allyl sulfonic acid copolymers as scale inhibitors in evaporative desalination units.

U.S. Pat. No. 4,640,793 discloses the use of admixtures containing carboxylic acid/sulfonic acid polymers and phosphonates as scale and corrosion inhibitors.

U.S. Pat. No. 4,166,041 discloses the use of mixtures of polymers prepared from an ethylenically unsaturated dibasic acid and an ethylenically unsaturated sulfonic acid as magnesium hydroxide scale inhibitors in evaporative desalination units. Maleic anhydride/allyl sulfonic acid copolymers are used in these admixtures.

EPO Pat. Applin. No. 84102890.5 discloses copolymers of maleic acid and an adduct of an oxyalkylene and allyl alcohol, and the use thereof for scale inhibition.

U.S. Pat. No. 4,297,237 discloses the use of polymaleic anhydride and polyphosphonates as corrosion inhibitors, and U.S. Pat. Nos. 3,810,834, 3,963,363 and 4,089,796 disclose methods of treating the water of an aqueous system with hydrolyzed polymaleic anhydride to inhibit scale formation.

U.S. Pat. Nos. 2,723,956, 3,289,734, 3,292,152, 3,578,589 and 3,715,307 relate to the use of polymaleic anhydride and copolymers thereof as scale control agents.

U.S. Pat. No. 3,965,027 discloses the use of certain amine adducts of polymaleic anhydride as scale and corrosion inhibitors.

European patent application No. 84301450.7 discloses carboxylic acid/sulfonic acid copolymers in combination with organic phosphonates as scale inhibitors.

However, none of the prior art references described above in any way suggest the efficacy of the instant polymers as calcium scale control agents in systems operating under severe pH and/or calcite saturation levels.

Many commercial waters contain alkaline earth metal cations, such as calcium, barium, magnesium, etc., and anions such as carbonate, sulfate, oxalate and/or phosphate. When the concentrations of these anions and cations are sufficiently high, insoluble reaction products (precipitates) form until the solubility limits are no longer exceeded. These precipitates are alkaline earth metal scales. For example, when the concentrations of calcium ion and any of the above mentioned anions are sufficient to exceed the solubility limitations of the calcium-anion reaction products, a solid phase of calcium scales will form as a precipitate.

Solubility product concentrations are exceeded for various reasons, such as evaporation of the water phase, change in pH, pressure, or temperature, and the introduction of additional ions which can form soluble compounds with the ions already present in the solution. As these reaction products precipitate on heat transfer surfaces in contact with aqueous systems, they form scale. The scale prevents effective heat transfer, interferes with fluid flow, facilitates corrosive processes, and harbors bacteria. Scale is an expensive problem in many industrial water systems, causing delays and shut downs for cleaning and removal. Alkaline earth metal scales commonly form on the metallic surfaces of apparatuses used for thermal treatment of aqueous solutions and suspensions. By alkaline earth metal scales, we mean scale including but not limited to calcium carbonate, calcium oxalate, magnesium oxalate, calcium phosphate, and calcium sulfate. These scales frequently form in the tubes of heat exchangers and on other heat exchange surfaces.

In the past, alkaline earth metal scale inhibition has been facilitated by the use of anionic polyelectrolytes such as polyacrylates, polymaleic anhydrides, copolymers of acrylates and sulfonates, and polymers of sulfonated styrenes and/or by the use of organo-phosphonates, such as hydroxyethylidene diphosphonic acid (HEDP) and aminotrimethylene phosphonic acid (AMP). However, these traditional scale inhibitors are ineffective or less effective in highly alkaline water. For example, HEDP is ineffective because it reacts with calcium at high pH's to form a calcium/phosphonate scale. Due to the difficulty in controlling alkaline earth metal scale under high pH and/or alkalinity conditions, operators generally add acid to lower the pH and consume alkalinity to prevent scaling. The handling of corrosive acid is dangerous and the maintenance of a desired pH may be difficult.

In recent years, increasing the cycles of concentration in industrial cooling towers has become important, especially in the regions where the water supply is limited. Higher cycles correspond to higher concentrations of scale forming elements. With the elimination of acid feed, the higher pH's generated bring a cooling system to high saturation levels more rapidly.

Accordingly, the need exists for an inexpensive, efficient method and polymer or polymer composition for preventing the formation of deposits on metallic surfaces in contact with water by inhibiting the formation of scale and/or by dispersing scale-forming compounds. This need is especially critical in systems which operate under severe pH and/or calcite saturation conditions.

The instant inventors have discovered a method for controlling scale deposition and/or dispersing scale-forming compounds in aqueous systems which operate under severe pH and/or calcite saturation conditions using maleic acid/allyl sulfonate polymers. While such polymers alone are effective inhibitors, other conventional scale and/or corrosion inhibitors may enhance their performance under certain conditions.

The instant polymers are especially effective as agents for controlling calcium carbonate under high pH/high calcite saturation conditions.

DETAILED DESCRIPTION OF THE INVENTION

The instant invention is directed to a method for controlling scale deposition in an aqueous system operating under severe pH and/or calcite saturation conditions comprising adding to the system being treated an effective amount of a water-soluble polymer which comprises (a) an ethylenically unsaturated dibasic carboxylic acid or anhydride, preferably maleic acid or anhydride (MA), and (b) allyl sulfonic acid or a salt thereof, preferably sodium allyl sulfonate, wherein the mole ratio of (a):(b) ranges from about 1:3 to about 3:1, preferably from about 1:2 to about 2:1, most preferably from about 1:1.5 to about 1.5:1. Water soluble salts of such polymers can also be used.

The molecular weight of the instant polymer ranges from about 500 to about 50,000, preferably from about 500 to about 10,000.

Any ethylenically unsaturated dibasic carboxylic acid or anhydride can be used as monomer (a). For example, maleic acid or itaconic acid or their anhydrides can be used. Maleic acid and maleic anhydride are preferred.

The maleic anhydride/allyl sulfonic acid polymers of the instant invention may be prepared by photopolymerization or by solution polymerization techniques, preferably by solution polymerization using a persulfate-type initiator. Since the maleic anhydride groups may be hydrolyzed very readily, for example by heating with water or by neutralizing with alkali, to form free carboxylic acid groups and/or carboxylate salts with possibly some residual anhydride groups, the term "maleic anhydride" as used in this specification includes the groups formed by the hydrolysis of maleic anhydride groups. For this reason, "maleic acid" and "maleic anhydride" are used interchangeably.

The instant polymers are preferably prepared by polymerizing at least one ethylenically unsaturated dibasic carboxylic acid or anhydride, preferably maleic acid or anhydride, in combination with allyl sulfonic acid or a salt thereof, preferably sodium allyl sulfonate.

The mole ratio of the acid or anhydride to allyl sulfonic acid or salt thereof in the monomer mix may range from about 1:3 to about 3:1, preferably from about 1:2 to about 2:1 and most preferably from about 1:1.5 to about 1.5:1. The monomer mix is an aqueous solution or slurry comprising the monomers and water.

An effective amount of an instant polymer should be added to the aqueous system being treated. As used herein, the term "effective amount" is that amount of polymer necessary to control scale deposition in the system being treated. Generally, the effective amount will range from about 0.1 to about 200 ppm, on an active basis, based on the total weight of the aqueous system being treated, preferably from about 1 to about 200 ppm.

As used herein, the term "controlling scale deposition" is meant to include scale inhibition, threshold precipitation inhibition, stabilization, dispersion, solubilization, and/or particle size reduction of scales, especially alkaline earth metal, iron and zinc scales. Clearly, the instant additives are threshold precipitation inhibitors, but they also stabilize, disperse and solubilize scale forming compounds, such as iron oxide.

The instant polymers are useful in controlling the formation of calcium carbonate scale in cooling water systems which have high calcite concentration, high pH and/or high alkalinity values. Such conditions are often times encountered as cycles of concentration increase.

Thus, the inventors have discovered that the instant polymers, alone or in combination with other scale and/or corrosion inhibitors, inhibit, minimize or prevent scaling under severe operating conditions, where conventional calcium carbonate inhibitors such as AMP, HEDP and polyacrylic acid are ineffective, and intend that the instant specification describe this discovery, without attempting to describe the specific mechanism by which scale deposition is prevented or inhibited.

The term "aqueous system", as used herein, is meant to include any type of system containing water, including, but not limited to, cooling water systems, boiler water systems, desalination systems, scrubber water systems, blast furnace water systems, reverse osmosis systems, evaporator systems, paper manufacturing systems, mining systems and the like.

The use of a maleic anhydride/allyl sulfonic acid polymer is critical to the instant method. These polymers inhibit and/or prevent scale deposition under severe saturation and/or temperature conditions, and are generally efficient in the alkaline pH ranges, preferably from about 7.5 to about 10.0, and most preferably from about 8.0 to about 9.5.

Also, other monomers may be added to the monomer mix and polymerized with the acid/anhydride and allyl sulfonic acid to produce polymers having additional moieties. Examples of such monomers include acrylic acid, acrylamide, dialkyldiallyl ammonium monomers, allylamine, diallylamine and similar unsaturated vinyl-/allyl compounds.

Chain transfer agents may also be added to the monomer mix to produce lower molecular weight polymers. Examples of such chain transfer agents include 2-propanol, formic acid and thioglycolic acid.

The instant polymers may be added to the system being treated by any convenient means. A preferred method of addition is via makeup water streams.

Additionally, other conventional water treatment agents, including but not limited to corrosion inhibitors such as zinc salts, orthophosphate sources and triazoles, can be used with the instant polymers.

The inventors have found that compositions comprising the instant polymers, a phosphonate and/or an acrylic acid/acrylamidomethylpropyl sulfonic acid polymer (AA/AMPSA) to be especially effective in inhibiting and/or preventing scale deposition in systems operating under severe pH and/or calcite saturation conditions.

EXAMPLES

The following examples are illustrative of the instant invention. However, they are not intended to limit the scope of the invention in any way.

Synthesis of Maleic Acid/Sodium Allyl Sulfonate Copolymer (MA/SAS)

Example 1

A mixture of maleic anhydride briquettes (98 g) and sodium allyl sulfonate solution (576 g, 25% active) was heated to reflux (105°–110° C.). A part of the condensate was stripped out to keep the initial monomer concentration at approximately 40%. A solution of sodium persulfate initiator (20 g $Na_2S_2O_8$/40 g $H_2O$) was fed over five hours. The result was a maleic anhydride/sodium allyl sulfonate polymer having a weight average molecular weight of about 2400.

Example 2

A mixture of maleic anhydride briquettes (98 g) and sodium alkyl sulfonate solution (576 g, 25% active) was adjusted to pH 6 using sodium carbonate, and then heated to 100° C. A solution of sodium persulfate initiator (41%) was fed over four hours. The result was a maleic anhydride/sodium allyl sulfonate polymer having a weight average molecular weight of about 2400.

Example 3

Threshold Inhibition (pH 9) Test

The following test demonstrates the efficacy of the instant compositions under severe operating conditions.

Calcium Carbonate Inhibition

Calcium carbonate inhibition was determined by adding a given concentration of the designated inhibitor to a solution containing 250 mg/L $Ca^{+2}$ (as $CaCl_2$) and 600 mg/L of alkalinity as $HCO_3^{-1}$, at an initial pH of 9.0. The solution was stored in a stagnant flask for 24 hours at 55° C. Poor performing inhibitors allowed a precipitate of $CaCO_3$ to form. To remove these "solids", the solution was filtered through a 2.5 micron filter. The inhibitor effectiveness under these conditions was obtained by determination of the soluble calcium content of the test solutions using the Schwarzenbach titration method (EDTA, chrome black T indicator). The soluble calcium ion concentration in the absence of inhibitor is equivalent to 0% scale inhibition. The percent inhibition for a given test is determined by:

$V_o$ = the Schwarzenbach titration volume with no inhibitor present (control)

$V_t$ = the Schwarzenbach titration volume when no precipitation occurs $V_e$ = the experimental Schwarzenbach titration volume when inhibitors are present in the test solution Results are shown in Table I.

TABLE I

| Sample | pH 9 $CaCO_3$ Inhibition Dosage (ppm) | % Inhibition after 24 hours |
|---|---|---|
| Example 1 (MA/SAS) | 40 | 94 |
| Comparative Inhibitor A | 40 | 83 |
| Comparative Inhibitor B | 40 | 85 |

Comparative Inhibitor A: polyacrylic acid MW 2,100 (PAA)

Comparative Inhibitor B: Belclene 200, polymaleic acid (PMA) commercially available from Ciba Geigy

Example 4

Threshold Inhibition

1. Two-Component Mixtures

Calcium carbonate inhibition was measured using the procedure of Example 3. A MA/SAS copolymer (Example 1) was combined with various AA/AMPSA* copolymers. The results are shown in Table II.

** AA/AMPSA refers to an acrylic acid/2-acrylamido2-methylpropyl sulfonic acid copolymer.

TABLE II pH 9 $CaCO_3$ Inhibition: MA/SAS - AA/AMPSA Blends

| Inhibitor #1 | Dosage (ppm) | Inhibitor #2 | Dosage (ppm) | % Inhibition after 24 hours |
|---|---|---|---|---|
| 1:1 MA/SAS | 40 | 60/40* AA/AMPSA | 10 | 94 |
| 1:1 MA/SAS | 40 | 75/25* AA/AMPSA | 10 | 97 |
| 1:1 MA/SAS | 40 | 90/10* AA/AMPSA | 10 | 94 |

*Mole ratios.

Example 5

Threshold Inhibition (pH 9)

1. Three-Component Mixtures (24 hour test)

A 1:1 MA/SAS copolymer was tested in three-component mixtures with organic phosphonates and AA/AMPSA copolymers. As shown in Table III, these combinations gave excellent 24-hour inhibition performance. Comparison of the 1:1 MA/SAS copolymer with a PAA in the same three-component mixtures clearly shows the performance advantage provided by this copolymer over PAA under severe pH and/or calcite saturation conditions.

TABLE III

24-Hour, pH 9 $CaCO_3$ Inhibition - Three-Component Mixtures

| Inhibitor Formulation | Dosage (ppm) | % Inhibition |
|---|---|---|
| (1:1 MA/SAS)/Dequest 2054*/ (75/25 AA/AMPSA) | 30/10/10 | 100 |
| (1:1 MA/SAS)/Dequest 2054/ (60/40 AA/AMPSA) | 30/10/10 | 100 |
| (1:1 MA/SAS) HEDP/ (60/40 AA/AMPSA) | 30/10/10 | 94 |
| PAA/Dequest 2054/(60/40 AA/AMPSA) | 30/10/10 | 92 |
| PAA/Dequest 2054/(75/25 AA/AMPSA) | 30/10/10 | 97 |
| PAA/Dequest 2054/(60/40 AA/AMPSA) | 10/20/20 | 95 |
| (1:1 MA/SAS)/Dequest 2054/ (60/40 AA/AMPSA) | 20/10/10 | 100 |
| (1:1 MA/SAS)/Dequest 2054/ (60/40 AA/AMPSA) | 30/5/5 | 94 |
| p-AA/Dequest 2054/(60/40 AA/AMPSA) | 30/5/5 | 80 |

*Dequest 2054:Hexamethylene diamine tetraphosphonic acid

2. Three Component Mixtures (5-day test)

Three component compositions of the MA/SAS polymer with organic phosphonates and AA/AMPSA copolymers were tested in a 5-day stagnant flask test. This test procedure is the same as the one described in Example 2 except that the flasks were incubated at 55° C. for 5 days. The results of this test are shown in Table IV.

TABLE IV pH 9, $CaCO_3$ Scale Inhibition - 5-Day Stagnant Flask Test

| Inhibitor Formulation | Dosage (ppm) | % Inhibition |
|---|---|---|
| (1:1 MA/SAS)/Dequest 2054/ (75/25 AA/AMPSA) | 36/12/12 | 98 |
| (1:1 MA/SAS)/Dequest 2054/ (75/25 AA/AMPSA) | 30/10/10 | 99 |
| (1:1 MA/SAS)/Dequest 2054/ (75/25 AA/AMPSA) | 24/8/8 | 98 |
| (1:1 MA/SAS)/Dequest 2054/ (75/25 AA/AMPSA) | 18/6/6 | 85 |
| (1:1 MA/SAS)/Dequest 2054/ (60/40 AA/AMPSA) | 30/10/10 | 98 |
| (1:1 MA/SAS/Bayhibit AM/ (75/25 AA/AMPSA) | 30/10/10 | 95 |
| (1:1 MA/SAS)/HEDP/ (75/25 AA/AMPSA) | 30/10/10 | 81 |

Dequest 2054—Hexamethylenediamine tetraphosphonic acid

Bayhibit AM—2-phosphonobutane-1,2,4-tricarboxylic acid, ammonium salt

What we claim is:

1. A method for controlling calcium carbonate scale deposition in an aqueous system comprising adding to said system a composition comprising:

(A) a polymer comprising: (a) maleic acid or anhydride; and (b) allyl sulfonic acid or salt thereof; wherein the mole ratio of (a):(b) ranges from about 3:1 to about 1:3;
(B) an acrylic acid/acrylamidomethylpropyl sulfonic acid polymer; and
(C) a phosphonate; wherein an effective amount of said composition is added and wherein the weight ratio of A/B/C ranges from about 20-30/5-10/5-20.

2. The method of claim 1, wherein the weight ratio of A/B/C is about 30/10/10.

3. The method of claim 1, wherein the pH of said aqueous system is about 9.0-10.0.

4. The method of claim 2, wherein the pH of said aqueous system is about 9.0-10.0.

* * * * *